US008656496B2

(12) United States Patent
Artzi et al.

(10) Patent No.: US 8,656,496 B2
(45) Date of Patent: Feb. 18, 2014

(54) GLOBAL VARIABLE SECURITY ANALYSIS

(75) Inventors: Shay Artzi, Brookline, MA (US); Ryan Berg, Sudbury, MA (US); John Peyton, Arlington, MA (US); Marco Pistoia, Amawalk, NY (US); Manu Sridharan, Boulder, CO (US); Takaaki Tateishi, Yamato (JP); Omer Tripp, Har-Adar (IL); Robert Wiener, Framingham, MA (US)

(73) Assignee: International Business Machines Corporations, Armonk, NY (US)

( * ) Notice: Subject to any disclaimer, the term of this patent is extended or adjusted under 35 U.S.C. 154(b) by 188 days.

(21) Appl. No.: 12/951,435

(22) Filed: Nov. 22, 2010

(65) Prior Publication Data

US 2012/0131670 A1 May 24, 2012

(51) Int. Cl.
*G06F 11/07* (2006.01)
*G06F 9/455* (2006.01)

(52) U.S. Cl.
USPC ............... 726/25; 726/22; 726/23; 726/24; 717/127; 717/131

(58) Field of Classification Search
USPC ............... 726/22–25; 717/127, 131
See application file for complete search history.

(56) References Cited

U.S. PATENT DOCUMENTS

| | | | |
|---|---|---|---|
| 7,530,107 B1 * | 5/2009 | Ono et al. | 726/25 |
| 2005/0273860 A1 * | 12/2005 | Chess et al. | 726/25 |
| 2007/0266435 A1 * | 11/2007 | Williams et al. | 726/22 |
| 2008/0215768 A1 * | 9/2008 | Reid et al. | 710/22 |
| 2009/0259989 A1 * | 10/2009 | Cifuentes et al. | 717/110 |
| 2009/0307669 A1 * | 12/2009 | Garst et al. | 717/130 |
| 2011/0307734 A1 * | 12/2011 | Boesen et al. | 714/3 |

OTHER PUBLICATIONS

Omer Tripp et al., "TAJ: Effective Taint Analysis of Web Applications", PLDI Jun. 15-20, 2009, Dublin, Ireland.
Emmanuel Geay et al., "Modular String-Sensitive Permission Analysis with Demand-Driven Precision", ICSE 2009.

* cited by examiner

*Primary Examiner* — Beemnet Dada
*Assistant Examiner* — Kalish Bell
(74) *Attorney, Agent, or Firm* — Harrington & Smith; Louis J. Percello

(57) ABSTRACT

A method includes determining selected global variables in a program for which flow of the selected global variables through the program is to be tracked. The selected global variables are less than all the global variables in the program. The method includes using a static analysis performed on the program, tracking flow through the program for the selected global variables. In response to one or more of the selected global variables being used in security-sensitive operations in the flow, use is analyzed of each one of the selected global variables in a corresponding security-sensitive operation. In response to a determination the use may be a potential security violation, the potential security violation is reported. Apparatus and computer program products are also disclosed.

18 Claims, 7 Drawing Sheets

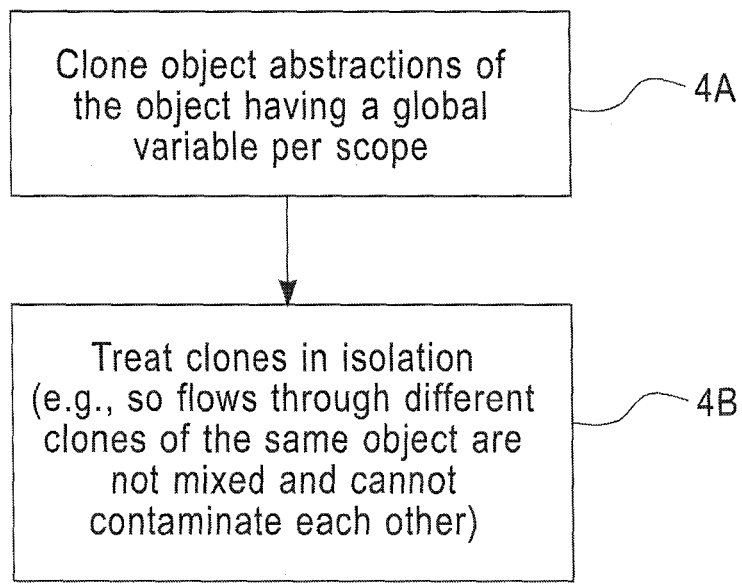

GLOBAL VARIABLE SECURITY ANALYSIS

BACKGROUND

This invention relates generally to analysis of code such as source code, object code, byte code, executable code, and libraries, and, more specifically, relates to static analysis of code for global variable security analysis that can provide selective, scope-sensitive, lifetime-sensitive, and map-key-sensitive global-side-effect analysis.

Static analysis of a program constructs a mathematical model of the execution of the program. The program is not actually executed, but is instead analyzed via the mathematical model. That is, the execution of the program is simulated.

Static analysis has particular benefits for certain types of programs. For instance, Web programs commonly accept untrusted input from users and use the untrusted input in secure transactions, access to SQL (structured query language) databases, or other security-sensitive operations. Prior to use in these security-sensitive operations, the untrusted input (typically a string) should be analyzed and revised if necessary to prevent possible security violations. As an example, a Web application might use a user name and password to access an SQL database using a query based on the user name and password. If the user name and password contain certain characters, the query might contain an undesirable, valid SQL instruction that could allow an attacker access to a portion of or the entire database. Removal of the characters prevents this from happening.

A runtime analysis of a large Web program may not find every or very many security violations, as during any runtime scenario, all possible untrusted input might not be used. A runtime analysis is therefore unsound. A static analysis will likely find more security violations, as every possible untrusted input can be considered (meaning a static analysis is sound).

Nonetheless, static analysis of programs such as Web programs could be improved.

SUMMARY

In an exemplary embodiment, a method includes determining selected global variables in a program for which flow of the selected global variables through the program is to be tracked. The selected global variables are less than all the global variables in the program. The method includes using a static analysis performed on the program, tracking flow through the program for the selected global variables. In response to one or more of the selected global variables being used in security-sensitive operations in the flow, use is analyzed of each one of the selected global variables in a corresponding security-sensitive operation. In response to a determination the use may be a potential security violation, the potential security violation is reported. Apparatus and computer program products are also disclosed.

BRIEF DESCRIPTION OF THE SEVERAL VIEWS OF THE DRAWINGS

FIG. 3 is a flowchart of an exemplary method for treating flows through selected global variables as special;

FIG. 4 is a flowchart of another exemplary method for treating flows through selected global variables as special;

DETAILED DESCRIPTION

Figure 1:
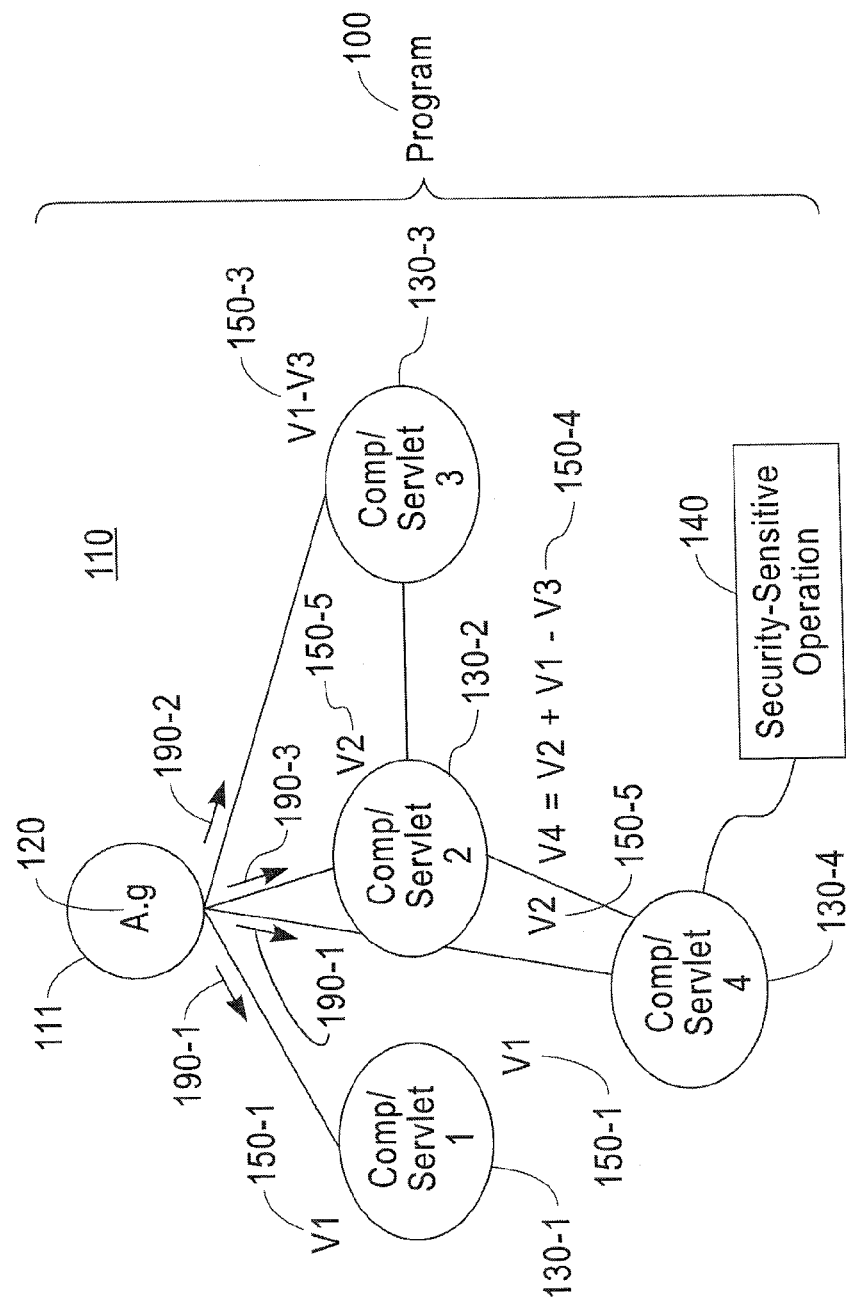
FIG. 1 is an exemplary representation of a software program using a global variable.

As previously described, static analysis of a program constructs a mathematical model of the execution of a program. To be useful, the mathematical model has to be sound (meaning that the model must describe all the dynamic behaviors that the program can have at run time). The main problem with this approach is that to scale to large programs, the analysis cannot be too precise, and so the model often models numerous spurious behaviors, which lead to false positives. A programming feature that is very expensive to model is the flow through global variables. Such variables can typically be accessed and modified by more than one program component because their scope goes beyond one single component. Therefore, modeling the flow of information through global variables require an expensive amount of modeling artifacts, since the states of all those components have to be tracked simultaneously. Many static analyzers opt to be unsound with respect to global variables because the analysis would not otherwise be able to scale to large programs. For several analyses, however, this compromise is unacceptable. For example, an analysis that tracks the flow of information throughout the execution of a program to detect integrity and confidentiality violations needs to take into account global variables and the flow through them.

Without taking global variables into account, numerous integrity and confidentiality violations would simply go undetected. This problem is particularly serious in today's Web applications, which use global data structures such as "request" and "session" objects to store information pertaining to interactions with end users. Those objects have a scope that spans several different components. It is therefore possible for untrusted data to be stored in a global session object by Component A and then retrieved by Component B and used by Component B in a security-sensitive computation. If the flow through the session object is disregarded, the integrity violation caused by use by Component B of the untrusted data in a security-sensitive computation would go unnoticed. Things are complicated at least by the following three considerations.

1. While the scope and lifetime of a local variable is limited to that programming construct of that variable's declaration (for example, a while loop, a method or a class), the scope and lifetime of a global variable does not necessarily encompass all the components in the program. In the Web application of today, the scope of a global variable may encompass a certain subset of the program's components. Therefore, a static analysis for any such program should be able to model the scope of a global variable including those situations in which that the scope of the global variable is not necessarily the same as the scope of the entire program.

2. Global objects often hold internal data structures, such as maps. Values are stored into such maps depending on some corresponding keys. It is often important for a static analysis to disambiguate flows through such global objects based on the corresponding keys. For example, a taint analysis tracking information flow of data for integrity purposes should be able to distinguish that a tainted flow reached the value corresponding to key "abc" in a session object, and not the value corresponding to key "xyz". This is important because if a component later reads the value corresponding to key "abc" and uses the value in a security-sensitive computation, then the analysis should flag that as a problem. However, if the component accesses the value corresponding to key "xyz" (which is not tainted) and uses this value in the security-sensitive computation, then no problem should be reported. Tracking such flows is complicated by the fact that keys are often not expressed as string constants. For example, key "abc" could be the result of the concatenation "a"+"bc" and so, to become key-sensitive, an analysis should be able to model string-manipulating operations in a program.

3. Given the prohibitive size of the Web applications of today, it is unlikely that a precise analysis that also keeps track of all the possible flows through the execution of a program (including flows through global variables) can scale to large programs. Therefore, tracking global flows selectively (for example, only for important objects that are known to participate in relevant information flows, such as session and request objects) is almost becoming a requirement to guarantee scalability.

So far, the solutions adopted by static analyzers for the problems described in Consideration 1 above are not satisfactory. Often, analyzers are made to be too conservative, so they can scale to large programs, but this also means that they do not offer useful results because they also produce too many false positives. For example, they ignore scopes and they are not map-key sensitive, causing any flow through a global variable to be contaminated by any other flow. Alternatively, analyzers are made to be unsound, by forcing them to ignore global flows. By contrast, the instant invention can solve the problem of security analysis of global flows, in, e.g., a scope-sensitive, map-key sensitive and selective manner in order to maintain scalability, precision, soundness and usefulness.

Before turning to a more detailed explanation of the exemplary embodiments, it is helpful to examine a simple example of a use of a global variable by a program. FIG. 1 is an exemplary representation 110 of a software program 100 using a global variable 120 ("A.g") of a global object 111. It should be noted that this representation 110 is merely for expositional purposes and should not be construed as limiting the instant invention in any way. The software program 100 may be, e.g., a complete software program (e.g., a user written portion and a library portion) or parts thereof, and may be in source code, library object code, object code, etc. In this simple example, the "A" represents a global object 111 to which the global variable "A.g" is associated, and the global variable 120 may be any type of field associated with an object, such as a simple instance variable or a complicated data structure. Additionally, the global object 111 may also hold other objects to which the global variable 120 is associated. The global variable 120, in this example, is accessed by the components 130-1 through 130-4. The components 130 are servlets in this example, but this is not a limitation on the invention.

In a flow 190-1, the servlet 130-1 accesses the global variable 120 and sets the value 150-1 of the variable to V1. Sometime later, the servlet 130-4 accesses the global variable 120 and performs a security-sensitive operation 140 with the global variable 120. At a later time, in a flow 190-2, the servlet 130-3 accesses the global variable 120 and subtracts V3 from V1 to create the value 150-3 of V1–V3 for the global variable 120. The servlet 130-3 passes this variable to the servlet 130-2, which further modifies the value 150-3 by adding V2 to this value, to create the value 150-4. The value 150-4 is then passed to the servlet 130-4 for use in the security-sensitive operation 140. As another example, sometime later in a flow 190-3, the servlet 130-2 accesses the global variable 120 and overwrites the value with value 150-5 (V2), which the servlet 130-2 then passes to servlet 130-4 for use in the security-sensitive operation 140.

As this simple example shows, the global variable 120 has multiple flows 190-1 through 190-3 through the program 100. Each of these flows 190 has the potential to cause a security violation when the corresponding value 150 is used in the security-sensitive operation 140. Each use of the global variable 120 through the flows 190 should be checked for a security violation and any potential security violation should be reported. It can easily be seen that scaling this example to a very large Web program (for example) able to serve hundreds or thousands of transactions can be problematic. The instant invention allows certain selected global variables 120 of interest to be analyzed for security violations.

Figure 2:
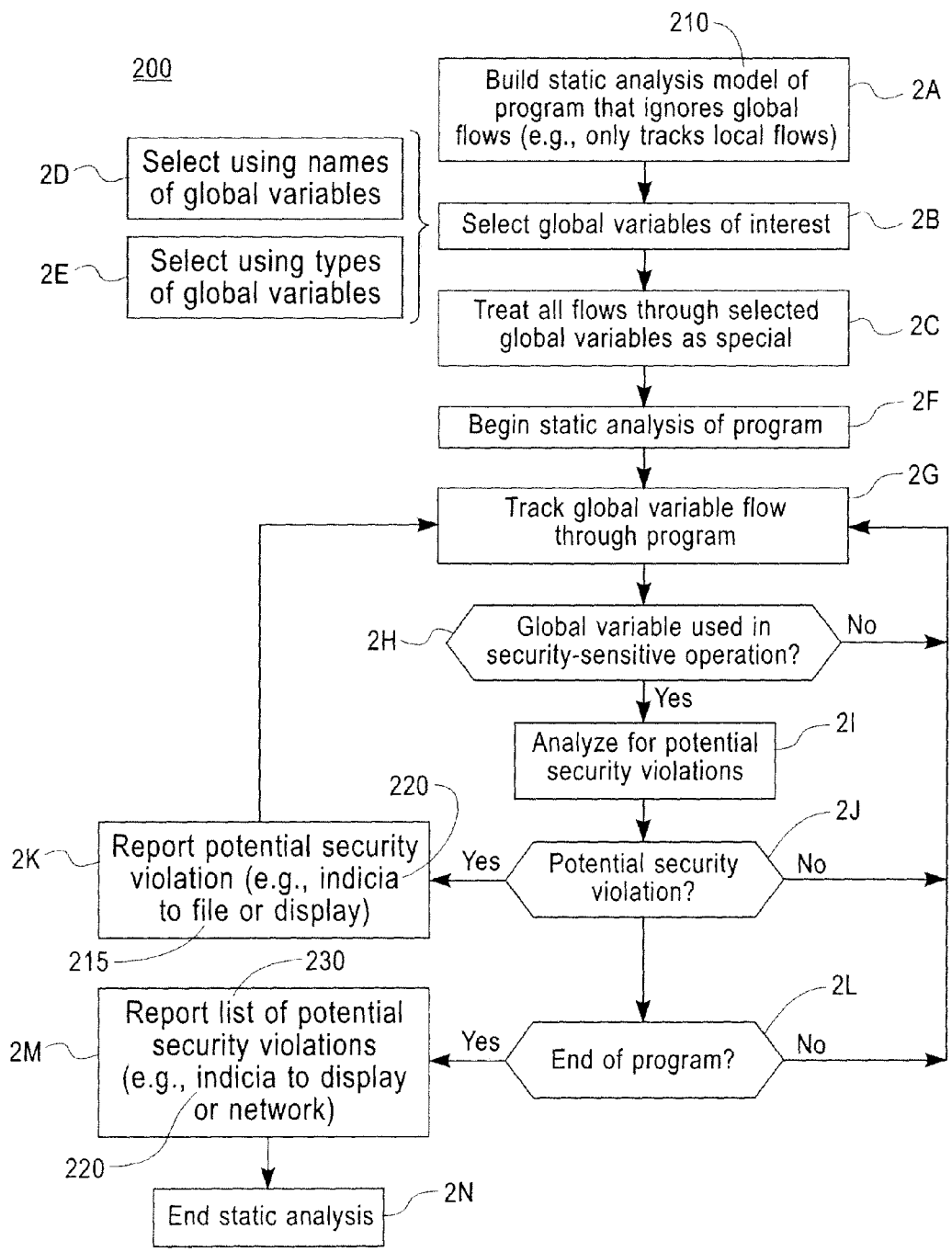
FIG. 2 is a flowchart of an exemplary method for global variable security analysis.

For instance, turning to FIG. 2, a flowchart is shown of an exemplary method 200 for global variable security analysis. Method 200 begins in block 2A, when a static analysis model 210 of a program 100 is built that ignores global variable flows. That is, the static analysis model 210 of the program 100 only tracks local flows of local variables, and ignores global flows of global variables for scalability reasons. Local flows are flows of local variables within components of the program and global flows are flows of global variables between components of the program. A local variable is a variable that is given local scope; such a variable is accessible only from the function or block in which it is declared. A global variable is a variable that is accessible in every scope. As another example, a variable is global if it retains its value after the function or program which uses the variable completes executing. Similarly, a variable is local if it does not retain its value after the function or program which uses the variable completes executing.

Then, global variables of interest are selected (block 2B), e.g., based on their names (block 2D) or even on their types (block 2E). For example, one could indicate that any variable of type A is of interest for special treatment. Then all the flows through these global variables are treated as special (block 2C). An exemplary embodiment does this by equating global variables to local variables. A possible solution consists of passing global variables along with other regular parameters in method calls (turn briefly to FIG. 3), thereby effectively making the global state of the program into a parameter that is passed from method to method during the entire simulated execution of the program. The choice of making this refinement selective (e.g., based on variable names or types) limits the impact that this refinement can have on the analysis scalability while allowing the analysis to concentrate the refinement on objects that are likely to participate in flows that are significant with respect to the analysis.

Returning to FIG. 2, in block 2F, the static analysis of the program 100 is begun, which includes a simulated execution of the program 100. In block 2G, global variable flow 190 is tracked through the program 100. In the example of FIG. 3, global variables are passed in method calls, and this passing is used to track the global variable flows 190. Additional examples of block 2G are described below. It is also noted that, in an exemplary embodiment, static analysis may be performed by a WALA (T. J. Watson Libraries for Analysis) static analysis tool, although other tools may also be used.

In block 2H, it is determined if a global variable 120 is used in a security-sensitive operation. Security-sensitive operations are known a priori. They are configured up front and they are known as "sinks". The analysis here scans all the methods in the program until it finds sinks. For every sink, the analysis detects whether a given global variable is used.

If a global variable 120 is not used in a security-sensitive operation (block 2H=NO), the method 200 continues in block 2G. If a global variable 120 is used in a security-sensitive operation (block 2H=YES), in block 21, the use of the global variable 120 in the security-sensitive analysis is analyzed. Analyzing the use of the global variable consists of determining the instructions in which the value of that variable is read or written. For example, given a global variable A.g, an instruction of the form A.g=x constitutes a write, while instructions of the form x=A.g or f(A.g), where f is a function in the program, constitute a read.

In block 2J, it is determined if there is a potential security violation. If not (block 2J=NO), the method 200 continues in block 2G. If so (block 2J=YES), a potential security violation is reported (block 2K), such as by writing an indicia 220 of the potential security violation to a file 215 or to a display. The method 200 then continues in block 2G.

In block 2L, it is determined if the end of the program has been reached. If not (block 2L=NO), the method 200 continues in block 2G. If so (block 2L=YES), then typically a list 230 of the potential security violations are reported (block 2M), e.g., using indicia 220 of the potential security violations to a display or to a network. In block 2N, the method 200 ends.

Typically, in block 2K, indicia 220 of the potential security violations are written to a file 215. In block 2M, the list 230 of indicia 210 would then be sent, e.g., to a display or a network as indicia 220. However, it is also possible to display the indicia 220 in block 2K, with or without saving the indicia 220 to a file 215.

In another exemplary embodiment, the analysis can be made scope-sensitive by cloning object abstractions of objects corresponding to a selected global variable: one object abstraction clone should be created per every scope. The scope is known a priori based on analysis configuration. For example, the scope can be a set of servlets. This means that the variable is global with respect to those servlets only (the variable can be read and written by any of those servlets), whereas that variable is not visible from other programs. Two clones of the same object should be treated in isolation so flows through different clones of the same object are not mixed and cannot contaminate each other. For instance, turning to FIG. 4, another exemplary method for treating flows 190 through selected global variables as special (see block 2C of FIG. 2) is shown. In block 4A, object abstractions of an object having a selected global variable is cloned per scope. This is explained in more detail below in reference to FIG. 5. In block 4B, the clones are treated in isolation, so flows 190 through different clones of the same object are not mixed and cannot contaminate each other.

It should be noted that cloning, such as in block 4A, is merely one exemplary embodiment. In another exemplary embodiment, the same representation of the global variable may be reused for different scopes and analysis data for the global variable would be reset between (e.g., prior to) analyzing the different scopes.

Figure 5:
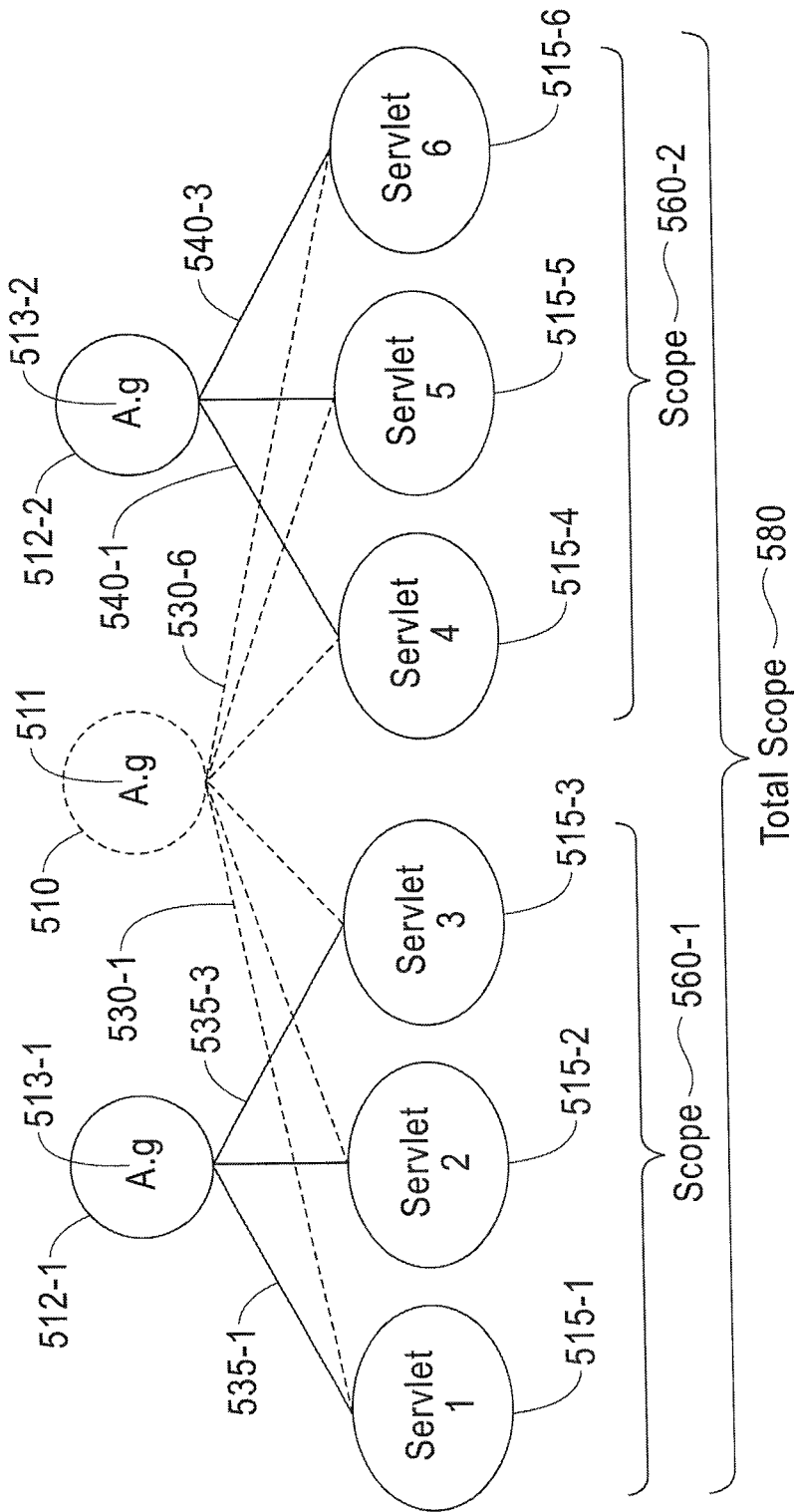
FIG. 5 an exemplary representation of cloning object extractions for a software program using a particular global variable.

FIG. 5 shows an exemplary representation of cloning object extractions for a software program using a particular global variable. In this example, there is an object 510 (e.g., "A") having a particular global variable 511 (e.g., "A.g"). In a program 110 without the techniques of FIG. 4 being applied, the global variable 511 has (or is affected by) flows 530-1 through 530-6 to servlets 515-1 to 515-6, respectively. The global variable 511 is associated with a total (e.g., global) scope 580.

After block 4A has been applied, the object 510 is abstracted into objects 512-1 and 512-2, each of which has a corresponding global variable 513-1 and 513-2. The object 510 is abstracted based on the corresponding scope 560-1 and 560-2. In scope 560-1, the global variable 513-1 has (or is affected by) flows 535-1 through 535-3 to servlets 515-1 to 515-3, respectively. Similarly, in scope 560-2, the global variable 513-2 has (or is affected by) flows 540-1 through 540-3 to servlets 515-4 to 515-6, respectively. It is noted that flows 530-1 through 530-3 should be equivalent to flows 535-1 through 535-3, and flows 530-4 through 530-6 should be equivalent to flows 540-1 through 540-3.

Block 4B is applied to FIG. 5 by treating each of the clones 512 in isolation so that flows 535 are not mixed with flows 540. In block 2G and subsequent blocks of FIG. 2, the flows 535, 545 are handled per clone 512-1, 512-2, respectively.

It is noted that the security analysis of global variables can be made map-key sensitive by using string analysis. String analysis is a family of static analysis techniques whose purpose is to over-approximate the grammar of the language of all the values that a string variable can have at run time. In particular, string analysis can be applied to the keys of any map object held by a global object whenever that map object participates in information-flow exchanges between different program components.

Figure 6:
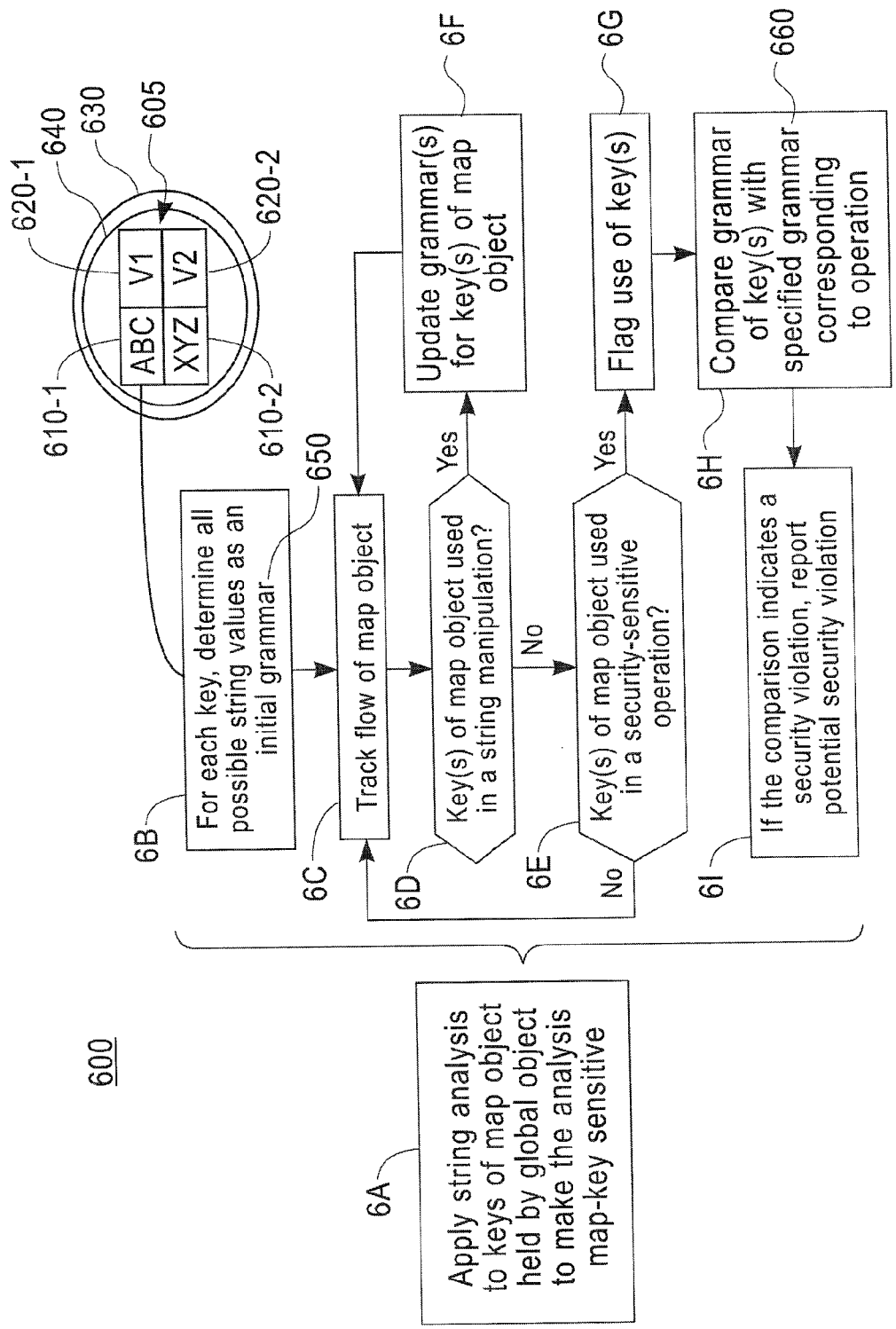
FIG. 6 is a flowchart of a portion of an exemplary method for map-key-sensitive global variable security analysis.

An example is shown in FIG. 6, which shows a flowchart of a portion of an exemplary method 600 for map-key-sensitive global variable security analysis. FIG. 6 in this example begins after block 2F of FIG. 2. In block 6A of FIG. 6, string analysis is applied to keys 610 of a map object 640 held by a global object 630 to make the global variable security analysis map-key sensitive. FIG. 6 shows a simple example, where keys 610-1 and 610-2 have corresponding values V1 620-1 and V2 620-2 and are representations of data fields 605 of the map object 640. Block 6A is performed in an exemplary embodiment by blocks 6B to 6G.

In block 6B, for each key 610, all possible string values are determined to determine initial grammars 650, each grammar 650 corresponding to a key 610. In block 6C, the flow of the map object 640 is tracked throughout the simulated execution of the program 100 that occurs during the static analysis of the program 100. In block 6D, it is determined if one or more keys 610 of the map object 640 are used in a string manipulation (such as concatenation). If so (block 6D=YES), then in block 6F, the grammar(s) 650 is updated for the one or more keys 610. Note that the string manipulation may change the values 620 of one or more keys 610. It is also noted that an embodiment could track situations in which a key is deleted. Another embodiment could conservatively keep all the keys, without ever considering their deletion, even if that occurs. If not (block 6D=NO), the method 600 continues in block 6E.

In block 6E, it is determined if one or more key(s) 610 of the map object are used in a security-sensitive operation. If not (block 6E=NO), the method 600 continues in block 6C. If so (block 6E=YES), in block 6G, the use of the key(s) 610 in a security-sensitive operation is flagged (e.g., reported as indicia in a file 215 or onto a display). Further, in block 6H, the grammar(s) 650 for the key(s) 610 are compared with specified grammar(s) 660 corresponding to the operation. For instance, the grammar 650 for a particular key 620 might be computed as $\Sigma$ (the alphabet of all characters for a string), but the specified grammar 660 might be $(\Sigma-\{;,'\})^*$, which should prevent SQL (structured query language) injections. In block 61, if the comparison indicates a security violation, a potential security violation is reported. In the example of the computed grammar $\Sigma$ and the specified grammar $(\Sigma-\{;,'\})^*$, the comparison should indicate a potential security violation, as the current grammar 650 of the key 610 includes additional characters not allowed by the specified grammar 660. Block 6I would then proceed to block 2L of FIG. 2, and if the end of the program is not reached, the method 200/600 would continue in block 6C.

FIG. 6 therefore provides for, e.g., a taint analysis tracking information flow of data for integrity purposes that should be able to distinguish that a tainted flow reached the value 620-1 corresponding to key "abc" (key 610-1) in a session object, and not the value 620-2 corresponding to key "xyz" (key 610-2). This is important because if a software component later reads the value 620-1 corresponding to key "abc" (key 610-1) and uses the value 620-1 in a security-sensitive computation, then the analysis should flag (block 6G) that as a problem. FIG. 6 further provides that grammar 650 associated with the tainted key 610-1 can be used to determine if this grammar 650 meets specified grammar 660.

It is noted that the flagging performed in block 6G and the grammar analysis performed in blocks 6B, 6F, 6H, and 6I are separable and need not both be performed. For instance, if specified grammars 660 are not known, then only block 6G could be performed and blocks 6B, 6F, 6H, and 6I would not be performed. As another example, block 6G might not be performed if blocks 6B, 6F, 6H, and 6I are believed to correct any potential errors, e.g., with a tainted string.

Figure 7:
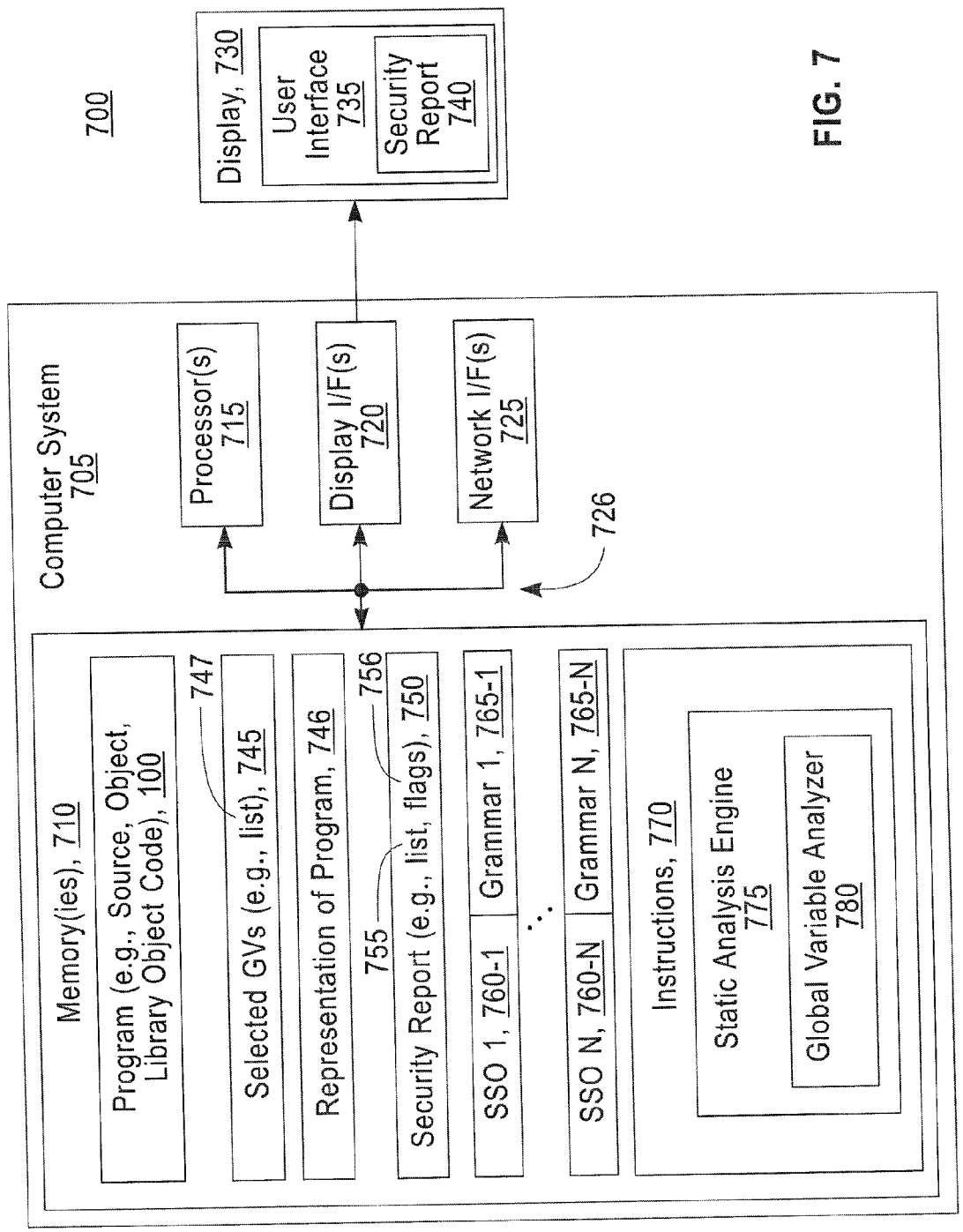
FIG. 7 is a block diagram of an exemplary system suitable for implementing the instant invention.

FIG. 7 is a block diagram of an exemplary system 700 suitable for implementing the instant invention. The system 700 in this example includes a computer system 705 coupled to a display 730. The display 730 has a user interface 735 displaying a security report 740. The computer system includes one or more memories 710, one or more processors 715, one or more display interfaces (I/Fs) 720, and one or more network interfaces 725, all interconnected through one or more buses 726.

The one or more memories 710 include the program 100 to be analyzed, the selected global variables 745 (e.g., as a list 747 of global variables), a representation 746 of the program 100, a security report 750 (e.g., a list 755 of potential security violations or flags 756 of use of possibly insecure keys 610 in security-sensitive operations), and a mapping of security-sensitive operations 760-1 through 760-N to corresponding grammars 765-1 to 765-N (e.g., grammars 660 as described above with respect to FIG. 6). For instance, a security-sensitive operation 760 could be an access to a SQL database, and the grammar 765 would therefore be $(\Sigma-\{;,'\})^*$. For XSS (cross-site scripting), it would be necessary to remove any JavaScript tag. This could be achieved by, e.g., replacing brackets < and > with their encodings, < and > respectively. The representation 746 could include the static analysis model 210, but may also include other models of the program 110, such as a points-to graph (not shown) or call graph (not shown).

The one or more memories 710 also include instructions 770, which when executed by the one or more processors 715 cause the computer system 705 to perform one or more of the actions described herein. The instructions 770 define a static analysis engine 775 and a global variable analyzer 780. The static analysis engine 775 performs the static analysis on the program 100 and creates the representation 746. The global variable analyzer 780 performs the methods and actions described herein (e.g., in FIGS. 2-6 and 8).

In one example, the security report 750 is sent to a client (e.g., whose program 100 is being analyzed) via the one or more network interfaces 725. As another example, the security report 750 is presented on the user interface 735 as security report 740, which is typically a modified version of the security report 750.

Figure 8:
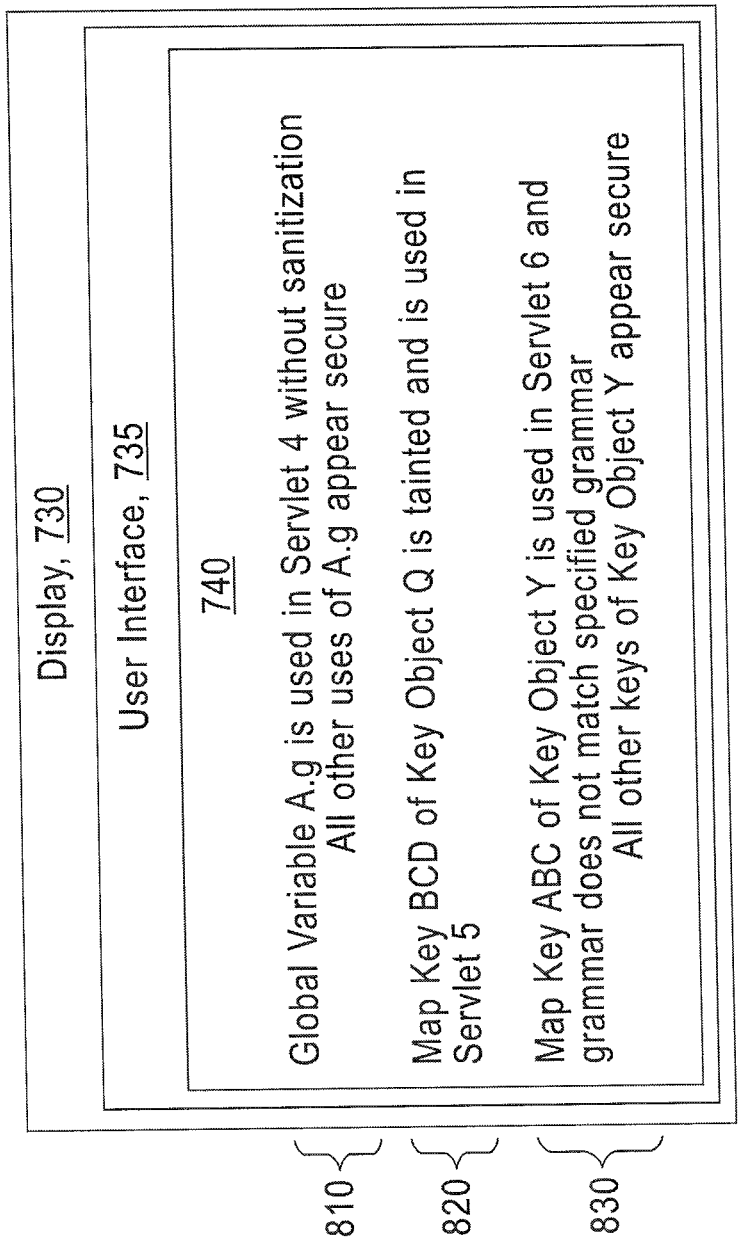
FIG. 8 is an example of a security report presented in a user interface of a display.

Referring now to FIG. 8, an example is shown of a security report 740 presented in a user interface 735 of a display 730. A number of examples are shown. In example 810, the security report 740 indicates that "Global Variable A.g is used in Servlet 4 without sanitization" and that "All other uses of A.g appear secure". This is the result, e.g., of an analysis in block 2I of FIG. 2 indicating that no sanitization occurs for the global variable A.g when used in a security-sensitive operation that requires sanitization, or that other uses of A.g do not cause potential security violations.

In example 820, the security report 740 indicates that "Map Key BCD of Key Object Q is tainted and is used in Servlet 5", and this is a flag 756 created in block 6G of FIG. 6. In example 830, the security report 740 indicates that "Map Key ABC of Key Object Y is used in Servlet 6 and grammar does not match specified grammar" and "All other keys of Key Object Y appear secure". This example indicates a potential security violation generated by block 6I of FIG. 6.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for implementing operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    determining by a computer system selected global variables in a program for which flow of the selected global variables through the program is to be tracked, the selected global variables being less than all the global variables in the program; and
    using a static analysis performed by the computer system on the program, where in the static analysis the program is not executed but is instead analyzed via a model of the program, performing the following:
        tracking flow through the program for the selected global variables, wherein tracking further comprises tracking flow through the program for a given one of the selected global variables by cloning object abstractions of an object having the given selected global variable per scope of the given selected global variable to create multiple clones of the object and by treating each of the clones in isolation, wherein flows through different clones of the object are not mixed;
        in response to one or more of the selected global variables being used in security-sensitive operations in the flow, analyzing use of each one of the selected global variables in a corresponding security-sensitive operation; and
        in response to a determination the use may be a potential security violation, reporting the potential security violation.

2. The method of claim 1, wherein reporting comprises placing indicia of the potential security violation into a file.

3. The method of claim 1, wherein reporting further comprises displaying indicia of the potential security violation using a user interface displayed on a display.

4. The method of claim 1, wherein determining the selected global variables in the program for which flow of the selected global variables through the program is to be tracked further comprises using at least one of a name of the selected global variable or a type of the selected global variable to determine that the flow of the selected global variable through the program is to be tracked.

5. The method of claim 1, wherein a given one of the selected global variables comprises at least one key of a map object and wherein using a static analysis performed on the program further comprises tracking flow through the program for each of the at least one keys; in response to one of the at least one keys being used in a security-sensitive operation in the flow, analyzing use of the one key in the security-sensitive operation; and in response to a determination the use of the one key may be a potential security violation, reporting the potential security violation.

6. The method of claim 1, wherein a given one of the selected global variables comprises at least one key of a map object and wherein using a static analysis performed on the program further comprises tracking flow through the program for a selected one of the at least one keys and determining and updating grammar for selected key for each string manipulation in which the selected key is involved; in response to one of the selected key being used in a security-sensitive operation in the flow, comparing a current grammar of the selected key with a specified grammar corresponding to the security-sensitive operation, and in response to the comparison indicating a security violation, reporting a potential security violation based on the comparison.

7. A computer program product, comprising:
a non-transitory computer readable storage medium having computer readable program code embodied therewith, the computer readable program code comprising:
code for determining selected global variables in a program for which flow of the selected global variables through the program is to be tracked, the selected global variables being less than all the global variables in the program; and
code for, using a static analysis performed on the program, where in the static analysis the program is not executed but is instead analyzed via a model of the program, performing the following:
tracking flow through the program for the selected global variables, wherein tracking further comprises tracking flow through the program for a given one of the selected global variables by cloning object abstractions of an object having the given selected global variable per scope of the given selected global variable to create multiple clones of the object and by treating each of the clones in isolation, wherein flows through different clones of the object are not mixed;
in response to one or more of the selected global variables being used in security-sensitive operations in the flow, analyzing use of each one of the selected global variables in a corresponding security-sensitive operation; and
in response to a determination the use may be a potential security violation, reporting the potential security violation.

8. The computer program product of claim 7, wherein reporting comprises placing indicia of the potential security violation into a file.

9. The computer program product of claim 7, wherein reporting further comprises displaying indicia of the potential security violation using a user interface displayed on a display.

10. The computer program product of claim 7, wherein determining the selected global variables in the program for which flow of the selected global variables through the program is to be tracked further comprises using at least one of a name of the selected global variable or a type of the selected global variable to determine that the flow of the selected global variable through the program is to be tracked.

11. The computer program product of claim 7, wherein a given one of the selected global variables comprises at least one key of a map object and wherein using a static analysis performed on the program further comprises tracking flow through the program for each of the at least one keys; in response to one of the at least one keys being used in a security-sensitive operation in the flow, analyzing use of the one key in the security-sensitive operation; and in response to a determination the use of the one key may be a potential security violation, reporting the potential security violation.

12. The computer program product of claim 7, wherein a given one of the selected global variables comprises at least one key of a map object and wherein using a static analysis performed on the program further comprises tracking flow through the program for a selected one of the at least one keys and determining and updating grammar for selected key for each string manipulation in which the selected key is involved; in response to one of the selected key being used in a security-sensitive operation in the flow, comparing a current grammar of the selected key with a specified grammar corresponding to the security-sensitive operation, and in response to the comparison indicating a security violation, reporting a potential security violation based on the comparison.

13. An apparatus, comprising:
at least one memory comprising computer code; and
at least one processor,
the computer code controlling the at least one processor to perform at least the following:
determining selected global variables in a program for which flow of the selected global variables through the program is to be tracked, the selected global variables being less than all the global variables in the program; and
using a static analysis performed on the program, where in the static analysis the program is not executed but is instead analyzed via a model of the program, performing the following:
tracking flow through the program for the selected global variables, wherein tracking further comprises tracking flow through the program for a given one of the selected global variables by cloning object abstractions of an object having the given selected global variable per scope of the given selected global variable to create multiple clones of the object and by treating each of the clones in isolation, wherein flows through different clones of the object are not mixed;
in response to one or more of the selected global variables being used in security-sensitive operations in the flow, analyzing use of each one of the selected global variables in a corresponding security-sensitive operation; and
in response to a determination the use may be a potential security violation, reporting the potential security violation.

14. The apparatus of claim 13, wherein reporting comprises placing indicia of the potential security violation into a file.

15. The apparatus of claim 13, wherein the apparatus further comprises a display interface coupled to the at least one processor and a display, and wherein reporting further comprises displaying indicia of the potential security violation using a user interface displayed on the display.

16. The apparatus of claim 13, wherein determining the selected global variables in the program for which flow of the selected global variables through the program is to be tracked further comprises using at least one of a name of the selected global variable or a type of the selected global variable to determine that the flow of the selected global variable through the program is to be tracked.

17. The method of claim 1, further comprising determining whether the one or more of the selected global variables are used in corresponding sinks in the program, wherein the sinks perform the security-sensitive operations.

18. The method of claim 17, wherein analyzing use further comprises for a selected global variable determining instructions in which a value of that selected global variable is read or written.

* * * * *